United States Patent
Gal-Yam et al.

(10) Patent No.: US 9,998,198 B2
(45) Date of Patent: Jun. 12, 2018

(54) DETECTION OF A DISPERSED PULSE SIGNAL

(71) Applicant: YEDA RESEARCH AND DEVELOPMENT CO. LTD., Rehovot (IL)

(72) Inventors: Avishay Gal-Yam, Rehovot (IL); Barak Zackay, Rehovot (IL); Eran Ofek, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days. days.

(21) Appl. No.: 15/346,747

(22) Filed: Nov. 9, 2016

(65) Prior Publication Data
US 2017/0141835 A1   May 18, 2017

Related U.S. Application Data

(60) Provisional application No. 62/255,544, filed on Nov. 16, 2015.

(51) Int. Cl.
*H04B 1/00* (2006.01)
*H04B 7/08* (2006.01)
*H04B 17/20* (2015.01)

(52) U.S. Cl.
CPC ............ *H04B 7/0851* (2013.01); *H04B 17/20* (2015.01)

(58) Field of Classification Search
CPC ............ G01B 9/02002; G01B 9/02004; G01B 9/02007; G01B 9/02014; G01J 11/00; H04B 17/20; H04B 7/0851
See application file for complete search history.

(56) References Cited

U.S. PATENT DOCUMENTS

| 7,076,168 B1 * | 7/2006 | Shattil | H04B 10/25752 398/202 |
| 8,269,168 B1 * | 9/2012 | Axelrod | H01Q 15/0086 250/336.1 |

(Continued)

OTHER PUBLICATIONS

Bannister et al. "Two efficient; new techniques for detecting dispersed radio pulses with interferometers: the Chirpolator and the Chirnageator" The Astrophysical Journal Supplement Series. Sep. 21, 2011;198(2):16.

(Continued)

*Primary Examiner* — Khanh C Tran
(74) *Attorney, Agent, or Firm* — Mark S. Cohen; Pearl Cohen Zedek Latzer Baratz LLP (57) ABSTRACT

A method for detecting a dispersed pulse in a received signal that has been dispersed by a dispersive medium includes obtaining an input array of cells, each indicating an intensity of a frequency component of the signal at a representative time. A fast dispersion measure transform (FDMT) is applied to concurrently sum the cells of the input array that lie along different dispersion curves, each curve defined by a known non-linear functional form and being uniquely characterized by a time coordinate and by a value of the dispersion measure. Application of FDMT includes initially generating a plurality of sub-arrays, each representing a frequency sub-band and iteratively combining pairs of adjacent sub-arrays in accordance with an addition rule until all of the initially generated plurality of sub-arrays are combined into an output array of the sums, in which a cell of the output array that is indicative of a transmitted pulse is identified.

20 Claims, 5 Drawing Sheets

(56) References Cited

U.S. PATENT DOCUMENTS

| | | | | |
|---|---|---|---|---|
| 9,423,307 | B2* | 8/2016 | Kane | G01J 11/00 |
| 2006/0241409 | A1* | 10/2006 | Winters | A61B 5/05 |
| | | | | 600/430 |
| 2007/0019282 | A1* | 1/2007 | Weiner | G02F 2/002 |
| | | | | 359/326 |
| 2012/0269521 | A1* | 10/2012 | Masuda | H01S 5/0427 |
| | | | | 398/182 |

OTHER PUBLICATIONS

Barsdell et al, "Accelerating incoherent dedispersion" Monthly Notices of the Royal Astronomical Society. Apr. 17, 2012;422(1). 379-92.

Brady "A fast discrete approximation algorithm for the Radon transform" SIAM Journal on Computing, Feb. 1998;27(1):107-19.

Clarke et al, "Performance of a novel fast transients detection system" The Astrophysical Journal Supplement Series. Feb. 25, 2013;205(1):4.

Clarke et al. "A multi-beam radio transient detector with real-time de-dispersion over a wide dm range" Journal of Astronomical Instrumentation. Mar. 2014;3(01):1450004.

Cordes et al, "Searches for fast radio transients" The Astrophysical Journal, Oct. 20, 2003;596(2):1142.

Götz et al. "A fast digital Radon transform—An efficient means for evaluating the Hough transform" Pattern Recognition, Apr. 1, 1996;29(4)711-8.

Hankins et al. "Nanosecond radio bursts from strong plasma turbulence in the Crab pulsar" Nature. Mar. 13, 2003;422(6928)141-3.

Lorimer et al, "A bright millisecond radio burst oi extragalactic origin" Science. Nov. 2, 2007;318(5851).777-80.

Magro et al. "Real-tin1e; fast radio transient searches with GPU de-dispersion" Monthly Notices of the Royal Astronomical Society. Nov. 2, 2011;417(4):2642-50.

Manchester et al. "The parkes Southern pulsar Survey—I. Observing and data analysis systems and initial results" Monthly Notices of the Royal Astronomical Society. Apr. 11, 1996;279(4):1235-50.

McLaughlin et al. "Searches for giant pulses from extragalactic pulsars" The Astrophysical Journal. Oct. 20, 2003;596(2):982.

Petroff et al. "An absence of fast radio bursts at intermediate galactic latitudes" The Astrophysicai Journal Letters. Jun. 20, 2014;789(2):L26.

Spitler et al. "Pulse broadening measurements from the galactic center pulsar j1745-2900" The Astrophysical journal letters. Dec. 10, 2013;780(1):L3.

Taylor JH "A sensitive method for detecting dispersed radio emission" Astronomy and Astrophysics Supplement Series. Jun. 1974;15:367.

Thompson et al, "Detection of fast radio transients with multiple stations: a case study using the Very Long Baseline Array" The Astrophysical Journal, Jun. 22, 2011;735(2):98.

Thornton et al. "A population of fast radio bursts at cosmological distances" Science. Jul. 5, 2013;341(6141):53-6.

Van Leeuwen et al. "Finding pulsars with LOFAR" Astronomy & Astrophysics. Jan. 1, 2010;509:A7.

Van Straten el al, "DSPSR: digital signal processing software for pulsar astronomy" Publications of the Astronomical Society of Australia. Jan. 2011;28(1):1-4.

Zackay et al. "An Accurate and Efficient Algorithm for Detection of Radio Bursts with an Unknown Dispersion Measure, for Single-dish Telescopes and Interferometers" The Astrophysical Journal, Jan. 16, 2017;835(1):11.

* cited by examiner

DETECTION OF A DISPERSED PULSE SIGNAL

CROSS-REFERENCE TO RELATED APPLICATIONS

This application claims benefit of U.S. Provisional Patent Application No. 62/255,544, filed Nov. 16, 2015, which is hereby incorporated by reference.

FIELD OF THE INVENTION

The present invention relates to detection of pulses. More particularly, the present invention relates to detection of a received signal that includes a pulse signal that has traversed a dispersive medium.

BACKGROUND OF THE INVENTION

Many applied techniques involve detection of pulses. Such techniques are applied in such fields as geology (e.g., for exploration for deposits of oil, gas, or other underground resources), detection (e.g., radar, lidar, and sonar), and communication. In these fields, a pulse (e.g., acoustic or electromagnetic) is created at one location for detection at another location, or for detection after reflection at the same location. In other fields, pulses that are remotely created by natural or manmade processes are detected and interpreted.

A pulse may be defined by its intensity as a function of time. A transmitted pulse may be characterized by a high intensity (e.g., relative to random background intensity fluctuations) as a function of time. A short pulse may be decomposed (e.g., by Fourier analysis or similar techniques) into a series of continuous waves of different frequency. Each component wave is characterized by an amplitude and phase.

In some cases, the pulse may pass through a dispersive medium through which waves of different frequency travel at different speeds. As a result of traversing the dispersive medium, the arrival times at the detector of different frequency components of the pulse may differ from one another. Equivalently, the phases of the component waves may be shifted by the traversal of the dispersive medium. As a result of travel through the dispersive medium, the pulse may become degraded (e.g., be transformed into a longer pulse with reduced intensity). In some cases, the dispersion may cause the pulse to become indistinguishable from random intensity fluctuations of the received signal.

Thus, it may become difficult to detect or interpret a pulse that has traversed a dispersive medium.

SUMMARY OF THE INVENTION

There is thus provided, in accordance with an embodiment of the present invention, a method for detecting a dispersed pulse in a received signal that has been dispersed by traversal of a dispersive medium, the method including: obtaining an input array of cells, the value of each cell being indicative of an intensity of a frequency component of the signal during a time period at a representative time, a time coordinate of each cell within the array being indicative of the representative time, and a frequency coordinate of each cell being indicative of a frequency of the frequency component; applying a fast dispersion measure transform (FDMT) to the input array to concurrently sum the values of subsets of the cells of the input array, the coordinates of the cells of each subset lying along one of a plurality of different dispersion curves, each dispersion curve being defined by a known non-linear functional form of dispersion in the dispersive medium and being uniquely characterized by a time coordinate of one of the cells of the subset of cells that is included in that dispersion curve, the one of the cells having a preselected frequency coordinate, and by a value of the dispersion measure, the summing to produce an output array of the sums, wherein a position of each sum in the array is indicated by a coordinate that is indicative of the time coordinate of one of the cells and by a coordinate that is indicative of the dispersion measure value, the application of FDMT including: initially generating a plurality of sub-arrays of the input array, each sub-array representing a frequency sub-band of an initial frequency range of the frequency coordinates of cells of the input array, the value of each cell of each of the sub-arrays being a summation over each of the different dispersion curves that includes a cell of that sub-array; and iteratively combining pairs of adjacent sub-arrays in accordance with an addition rule until all of the initially generated plurality of sub-arrays are combined into the output array of the sums; and identifying a cell of the output array that is indicative of a transmitted pulse.

Furthermore, in accordance with an embodiment of the present invention, obtaining the input array includes applying a short time Fourier transform (STFT) to a time series of measured intensity values of the received signal.

Furthermore, in accordance with an embodiment of the present invention, obtaining the input array further includes applying a phase shift to each component frequency prior to the application of the STFT.

Furthermore, in accordance with an embodiment of the present invention, the coordinate that is indicative of the dispersion measure value includes a time delay over the sub-band.

Furthermore, in accordance with an embodiment of the present invention, the addition rule includes adding the values of cells in the adjacent sub-arrays that correspond to a single dispersion curve.

Furthermore, in accordance with an embodiment of the present invention, the addition rule includes copying the values of cells in one of the adjacent sub-arrays when no cells of the other sub-array of the pair of adjacent sub-arrays is included in the same dispersion curve.

Furthermore, in accordance with an embodiment of the present invention, the iteratively combining pairs of adjacent sub-arrays is halted prior to all of the initially generated plurality of sub-arrays being combined into the output array of the sums, subsequent application of the addition rule being limited to combining cells whose values are determined to be significant.

Furthermore, in accordance with an embodiment of the present invention, a cell value is determined to be significant when the presence of a pulse signal in a dispersion curve that corresponds to that cell is not precluded.

Furthermore, in accordance with an embodiment of the present invention, a cell value is considered to be significant when the value differs from a mean random background value by at least a predetermined threshold value.

Furthermore, in accordance with an embodiment of the present invention, the threshold values are different for different iterations.

There is further provided, in accordance with an embodiment of the present invention, a system for detecting a pulse in a signal that has traversed a dispersive medium, the system including: a receiver for receiving the signal; and a processer in communication with a computer readable medium, wherein the computer readable medium contains a set of instructions wherein the processor is designed to carry out the set of instructions to: obtain an input array of cells, the value of each cell being indicative of an intensity of a frequency component of the signal during a time period at a representative time, a time coordinate of each cell within the array being indicative of the representative time, and a frequency coordinate of each cell being indicative of a frequency of the frequency component; apply a fast dispersion measure transform (FDMT) to the input array to concurrently sum the values of subsets of the cells of the input array, the coordinates of the cells of each subset lying along one of a plurality of different dispersion curves, each dispersion curve being defined by a known non-linear functional form of dispersion in the dispersive medium and being uniquely characterized by a time coordinate of one of the cells of the subset of cells that is included in that dispersion curve, the one of the cells having a preselected frequency coordinate, and by a value of the dispersion measure, the summing to produce an output array of the sums, wherein a position of each sum in the array is indicated by a coordinate that is indicative of the time coordinate of one of the cells and by a coordinate that is indicative of the dispersion measure value, the application of FDMT including: initially generating a plurality of sub-arrays of the input array, each sub-array representing a frequency sub-band of an initial frequency range of the frequency coordinates of cells of the input array, the value of each cell of each of the sub-arrays being a summation over each of the different dispersion curves that includes a cell of that sub-array; and iteratively combining pairs of adjacent sub-arrays in accordance with an addition rule until all of the initially generated plurality of sub-arrays are combined into the output array of the sums; and identify a cell of the output array that is indicative of a transmitted pulse.

Furthermore, in accordance with an embodiment of the present invention, the instructions to obtain the input array include instructions to apply a short time Fourier transform (STFT) to a time series of measured intensity values of the received signal.

Furthermore, in accordance with an embodiment of the present invention, the instructions to obtain the input array further include instructions to apply a phase shift to each component frequency prior to the application of the STFT.

Furthermore, in accordance with an embodiment of the present invention, the coordinate that is indicative of the dispersion measure value includes a time delay over the sub-band.

Furthermore, in accordance with an embodiment of the present invention, the addition rule includes adding the values of cells in the adjacent sub-arrays that correspond to a single dispersion curve.

Furthermore, in accordance with an embodiment of the present invention, the addition rule includes copying the values of cells in one of the adjacent sub-arrays when no cells of the other sub-array of the pair of adjacent sub-arrays is included in the same dispersion curve.

Furthermore, in accordance with an embodiment of the present invention, the instructions include instructions to halt the iteratively combining pairs of adjacent sub-arrays prior to all of the initially generated plurality of sub-arrays being combined into the output array of the sums, and to subsequently apply the addition rule only to combine those cells whose values are determined to be significant.

Furthermore, in accordance with an embodiment of the present invention, a cell value is determined to be significant when the presence of a pulse signal in a dispersion curve that corresponds to that cell is not precluded.

Furthermore, in accordance with an embodiment of the present invention, a cell value is considered to be significant when the value differs from a mean random background value by at least a predetermined threshold value.

Furthermore, in accordance with an embodiment of the present invention, the threshold value is different for different iterations.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options)

In accordance with an embodiment of the present invention, a system is configured to analyze a received wideband signal and to reverse the effects of an unknown dispersion of the signal for detection of a dispersed pulse signal. Reversal or undoing of effects of dispersion is herein referred to as dedispersion. Dedispersion in accordance with an embodiment of the present invention includes application of a technique that is herein referred to as fast dispersion measure transform (FDMT). As a result of dedispersion, a pulse may be detected. Alternatively or in addition, an original transmitted signal may be reconstructed from a dispersed received signal. Application of FDMT may be based on an assumed functional form of a dispersion relation that describes differences in arrival time or phase shift for different frequency or wavelength components of the transmitted signal. However, parameters of the dispersion relation (e.g., that are affected by such unknown factors as the size, density, or other relevant properties of the dispersive medium) are not known prior to the analysis.

Figure 1:
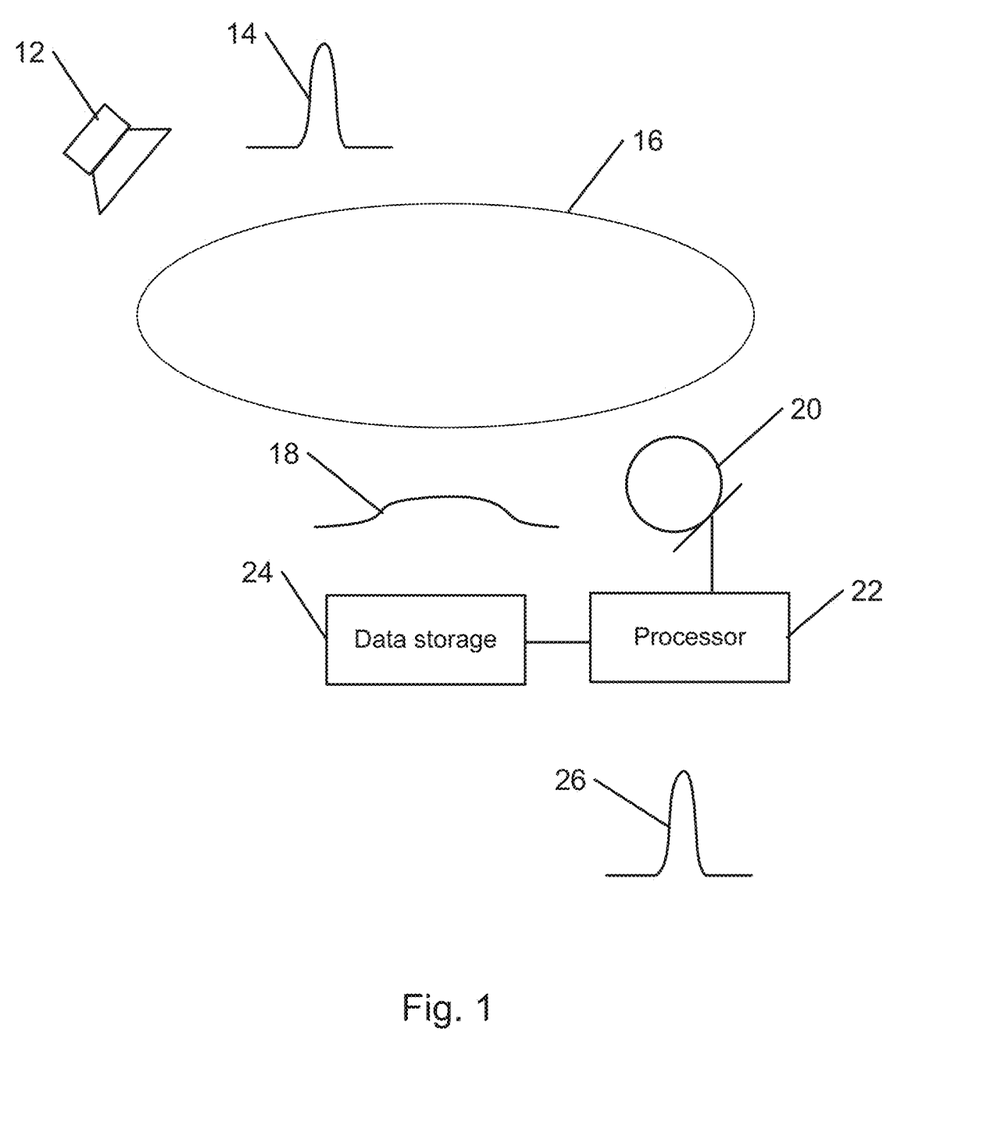
FIG. 1 schematically illustrates a system for detection of a dispersed pulse signal, in accordance with an embodiment of the present invention.

FIG. 1 schematically illustrates a system for detection of a dispersed pulse signal, in accordance with an embodiment of the present invention.

Dispersed pulse detection system 10 may be configured to perform dedispersion on a received pulse 18 that may have been transmitted by a transmitter 12 and subjected to dispersion in dispersive medium 16. A result of dedispersion may be utilized to determine a property of transmitter 12 or of transmitted pulse 14 (e.g., to receive a message that is encoded by a series of transmitted pulses 14, to identify or study a phenomenon that creates transmitted pulse 14, or another purpose), or of dispersive medium 16 (e.g., to study or identify a geological or biological region, to diagnose a communications channel, or for another purpose). Transmitter 12 may emit a signal that includes a transmitted pulse 14. For example, transmitter 12 may be configured to emit an acoustic, electromagnetic, or other type of pulse. For example, transmitter 12 may include a speaker, a laser or light-emitting diode, an antenna, an explosive device, or other device capable of producing a pulsed signal. Transmitter 12 may include a natural (e.g., astronomical, geological, or biological) source of pulses. Transmitted pulse 14 may be decomposable into a series of continuous component waves that are characterized by a broad range of frequencies, or equivalently, of wavelengths. In some cases, transmitter 12 may include a natural source of transmitted pulses (e.g., an astronomical or geological phenomenon), or an artificial source of which the details of operation are unknown.

Transmitted pulse 14 may traverse a dispersive medium 16 before reaching receiver 20. For example, dispersive medium 16 may include a dispersive geological medium, a plasma, a dielectric medium, or another dispersive medium.

Dispersive medium 16 may be inhomogeneous with different regions being characterized by different dispersive properties. Typically, the dispersive properties of dispersive medium 16, and the dimensions of dispersive medium 16, are not known. Receiver 20 may include a microphone, geophone, antenna, photonic receiver, or other device that may be utilized to receive a pulsed signal.

Dispersion in dispersive medium 16 may cause the component waves of transmitted pulse 14 to shift relative to one another. Thus, a received pulse 18 that arrives at receiver 20 may be reduced in intensity and extended in duration relative to transmitted pulse 14. In some cases, the received pulse may have become indistinguishable from random noise fluctuations.

A signal that is received by receiver 20 may be input into processor 22. For example, processor 22 may include one or more processing units, e.g. of one or more computers. Processor 22 may be configured to operate in accordance with programmed instructions. In particular, processor 22 may be configured to operate in accordance with programmed instructions to apply dedispersion on received pulse 18. Application of dedispersion on received pulse 18 may produce dedispersed pulse 26. If the application dedispersion accurately corresponds to the dispersion of transmitted pulse 14 by dispersive medium 16, dedispersed pulse 26 may be similar to transmitted pulse 14.

Processor 22 may communicate with data storage device 24. Data storage device 24 may include one or more volatile or nonvolatile, fixed or removable, local or remote, memory or data storage units, or another computer readable medium. Data storage device 24 may be utilized to store, for example, programmed instructions for operation of processor 22, data or parameters for use by processor 22 during operation (e.g., a received signal that includes received pulse 18), or results of operation of processor 22 (e.g., dedispersed pulse 26).

The applied dedispersion may be based on an assumed functional form of a dispersion relation. A dispersion relation may express a dispersion time (used herein interchangeably with the term delay time), expressed as a difference in arrival time (or, equivalently, phase difference), $\Delta t = t_2 - t_1$, between component waves of two different frequencies $f_1$ and $f_2$ (or, equivalently, of two different wavelengths $\lambda_1$ and $\lambda_2$). It is assumed that the functional form of the dispersion relation includes one or more unknown dispersion parameters, herein referred to collectively as the dispersion measure D. In addition, there is a known functional frequency dependence $G(f_1, f_2, D)$ on the frequencies whose arrival times are being compared. Thus, the dispersion relation may be expressed as $\Delta t = G(f_1, f_2, D)$ For example, dispersion measure D may represent a set of coefficients of powers of $f_1, f_2$. Typically, $G(f_1, f_2, D)$ monotonically varies with $f_1$ or $f_2$ within a frequency range of interest, and may be have a non-linear dependency on frequency. The value of the dispersion measure may be influenced by properties of the medium and by the path length of a pulse through the medium.

For example, in the case of propagation of electromagnetic pulses through a cold plasma (e.g., as is typical in radio astronomy applications), the functional frequency dependency may have the form $G(f_1, f_2, D) = d(f_2^{-2} - f_1^{-2})$ (the wave velocity being proportional to the square of the inverse frequency). In this case, the dispersion measure D represents a single multiplicative factor d. The dispersion relation may thus have a form $\Delta t = d(f_2^{-2} - f_1^{-2})$. Other functional forms of the frequency dependence of the dispersion relation may be appropriate for other types of pulses or media (e.g., for an acoustic pulse that traverses a geological medium).

It is assumed that properties of the dispersive medium are not known beyond the general functional dependency $G(f_1, f_2, D)$. In accordance with an embodiment of the present invention, the received signal is analyzed in order to estimate the dispersion measure, or, equivalently, the dispersion time. In some cases, a pulse may be detected by examination of the analysis results. In some cases, an estimated dispersion measure may be derived from the analysis results and may be used to calculate an estimated form of the pulse prior to dispersion.

The received signal is typically measured by performing a series of measurements over time (e.g., a sensed voltage). The measurements are indicative of the intensity of the received signal as a function of time. The sampling interval between measurements of the series may be sufficiently small so as to enable sampling of (e.g., satisfy the Nyquist criterion for) all component wave frequencies that are expected to contribute significantly to a pulse. In some cases, the received signal may be binned into time bins that are each wider than the sampling interval, in order to reduce the time resolution (e.g., so as to reduce computation time or other use of computing resources).

The received signal is analyzed to yield an intensity spectrum I(t,f) (over frequency f) of signal intensity I as a function of time t. The analysis may include dividing the measured signal into $N_t$ samples in $N_t$ time intervals, each of length τ. The signal in each time interval is subjected to a Fourier transform to yield the frequency spectrum of $N_f$ frequencies ranging from $f_{min}$ to $f_{max}$ for each of the samples. For example, a Fourier transform may be applied to a series of short time intervals in a process that is herein referred to as a short time Fourier transform (STFT). The result is a two dimensional $N_t \times N_f$ array of intensity values, where the two dimensional position of an intensity value in the array indicates the time and frequency of that intensity value. Alternatively or in addition to application of STFT, a polyphase filter-bank may be applied.

Dedispersion may be incoherent or coherent. Incoherent dedispersion herein refers to application of frequency-dependent time delays to the I(t,f) matrix. Incoherent dedispersion represents an approximation that may be valid only under certain conditions (e.g., for a pulse duration $t_p$ that is sufficiently long, e.g., $t_p > \sqrt{t_d \tau}$, where $t_d$ represents a maximum dispersion time). Coherent dedispersion herein refers to application of frequency-dependent phase shifts directly to the Fourier transform of the raw signal.

Figure 2A:
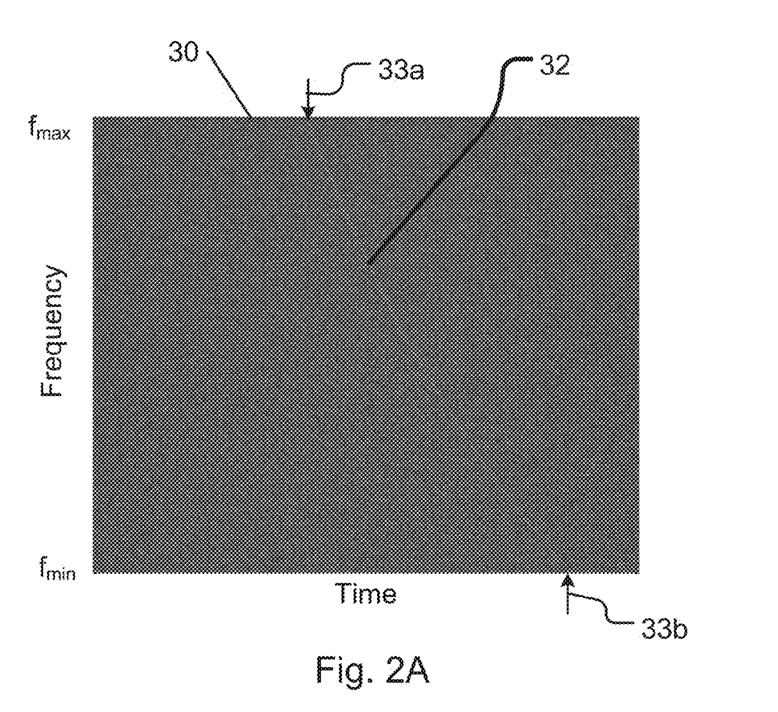
FIG. 2A displays a simulated representation of a signal that includes a dispersed pulse after application of short time Fourier transform (STFT).

FIG. 2A displays a simulated representation of a signal that includes a dispersed pulse after application of short time Fourier transform (STFT).

In intensity array 30, each point along the horizontal axis represents a representative time of a time period (approximately corresponding to an arrival or measurement time) of the signal during which the intensity was decomposed into component waves. The gray scale represents relative intensity (white representing maximum intensity). The vertical axis represents a component frequency in the range $f_{min}$ to $f_{max}$ resulting from application of STFT during the represented time period. Dispersed pulse curve 32 is a representation of a measured pulse signal that has been dispersed by a dispersive medium. (In the absence of dispersion, a received pulse would be represented by a vertical line, with no delay time.) Due to the dispersion, the arrival time of the signal that is represented by dispersed pulse curve 32 ranges from a first arrival time 33a (for a component wave with frequency $f_{max}$ in this case) to final arrival time 33b (for a component wave with frequency $f_{min}$ in this case).

In accordance with an embodiment of the present invention, the intensity array I(t,f) is dedispersed by an incoherent process that includes concurrent analysis of a range of possible values of the dispersion measure. This process is herein referred to as application of a fast dispersion measure transform (FDMT).

In application of FDMT, integrals (summations) of I(t,f) are calculated along a plurality of integration paths within the array. Each integration path corresponds to the dispersion relation with a particular dispersion measure and a particular time (here taken to be the final arrival time 33b. Each integration path begins at an initial arrival time $t=t_0$ at one end of the frequency range (e.g., $f_{min}$ or $f_{max}$), corresponding to an arrival time of the leading or trailing edge of the pulse (e.g., at $f_{min}$ to represent the trailing edge of a detected dispersed pulse in the case of electromagnetic waves in a cold plasma). This time may represent a time where the leading or trailing edge of a dispersed pulse, if such a pulse has in fact been transmitted, would be detected. The other end of the integration path is determined by a value of the dispersion measure and is located at a time $t=t_0+\Delta t$, where the arrival time difference $\Delta t$ is determined by the choice of the dispersion measure. Thus, the arrival time difference may represent a possible length of a detected pulse signal (from leading edge to trailing edge), if such a pulse has in fact been transmitted and if the correct dispersion measure has been selected.

Thus, the result of application of FDMT may be expressed as a two dimensional array of FDMT results. $A_{f_{min}}^{f_{max}}(t_0,\Delta t)$, the two dimensions representing final arrival time $t_0$ and arrival time difference $\Delta t$, for a frequency band ranging from $f_{min}$ to $t_{max}$:

$$A_{f_{min}}^{f_{max}}(t_0, D) = \sum_{f=f_{min}}^{f_{max}} I(t_0 - G(f_{min}, f, D), f).$$

An FDMT result $A_{f_{min}}^{f_{max}}(t_0,D)$ that corresponds to an actual detected pulse may be expected to stand out, e.g., have a greater intensity value, than FDMT results that do not correspond to a pulse.

Figure 2B:
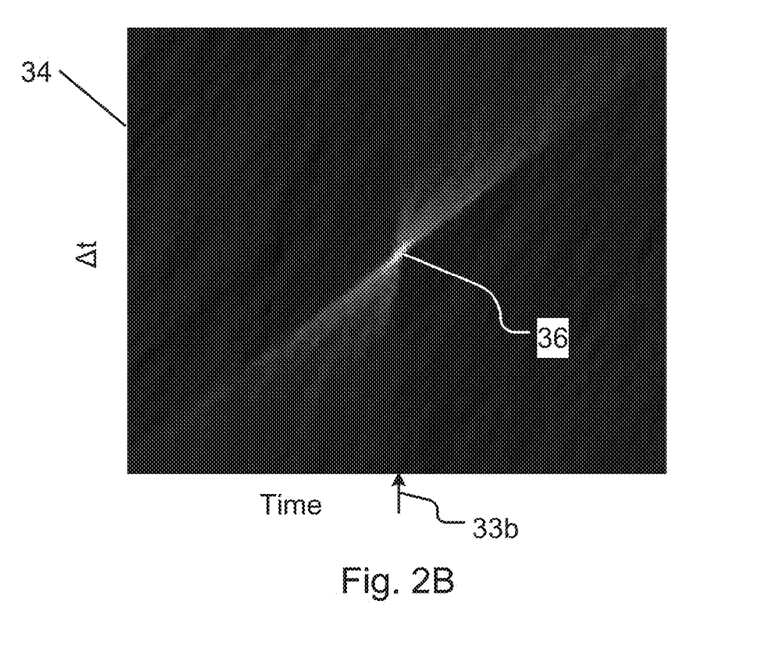
FIG. 2B displays a portion of a result of application of fast dispersion measure transform (FDMT) to the simulated representation of a signal shown in FIG. 2A.

FIG. 2B displays a portion of a result of application of fast dispersion measure transform (FDMT) to the simulated representation of a signal shown in FIG. 2A.

Intensity gray scale graph 34 shows FDMT output as a function of a representative arrival time (e.g., a final arrival time, represented by the horizontal axis) and arrival time difference $\Delta t$, which is proportional to the dispersion measure d in the case of cold plasma dispersion (vertical scale). Pulse output 36 represents application of FDMT to dispersed pulse curve 32. (Pulse output 36 is not point-like due to various calculation errors that result from the shortness of the original transmitted pulse, as indicated by the thinness of dispersed pulse curve 32.)

In order to reduce computational complexity and computation time, FDMT is applied using a process that includes a plurality of (typically $\log_2(N_f)$) iterations. The inputs to each iteration, for example, to the i th iteration, include the results of application of FDMT to a partition of the input array covering the original frequency band ($f_{min}$ to $f_{max}$) into $N_f/2^{(i-1)}$ sub-arrays, each covering a sub-band of $2^{(i-1)}$ frequencies each (the sub-array covering a sub-band is sometimes herein referred to simply as a "sub-band", for convenience). The outputs of the i th iteration are results of application of FDMT to a partition of the original input into $N_f/2^i$ sub-bands of $2^i$ frequencies each. Every pair of adjacent sub-bands is combined into a single sub-band by application of an addition rule that is described below. The output of $\log_2(N_f)$ iterations is application of FDMT to the entire original frequency band ($f_{min}$ to $f_{max}$).

For example, in the case where dispersion measure D represents a single multiplicative parameter d such that each curve may be parameterized by its $\Delta t$, the addition rule for combining two adjacent sub-bands that were output from the previous iteration ($A_{f_0}^{f_1}$ ranging over frequencies $f_0$ to $f_1$, and $A_{f_1}^{f_2}$ ranging over frequencies $f_1$ to $f_2$) into a single band $A_{f_0}^{f_2}(t_0,\Delta t)$ may be expressed as:

$$A_{f_0}^{f_2}(t_0,\Delta t) = A_{f_0}^{f_1}(t_0,t_0-t_1) + A_{f_1}^{f_2}(t_1,t_1-t_2).$$

Intersection time $t_1$ represents the intersection time of the dispersion curve at the central frequency $$f_1 = \frac{f_2 + f_0}{2}$$

and is uniquely determined by the dispersion curve formula:

$$t_1 \equiv t_0 - G(f_0,f_1,D),$$

For example, in the case of dispersion of electromagnetic waves in a cold plasma:

$$t_1 \equiv t_0 - d(f_0^{-2} - f_1^{-2})$$

As defined above, $A_{f_0}^{f_1}(t_0,t_0-t_1)$ represents a sum calculated over the unique dispersion curve between the coordinates $(t_0,f_0)$ and $(t_1,f_1)$, and $A_{f_1}^{f_2}(t_1,t_1-t_2)$ represents a similar sum between the coordinates $(t_1,f_1)$ and $(t_2,f_2)$. After an iteration of the FDMT algorithm, $A_{f_0}^{f_2}(t_0,t_0-t_2)$ represents the only dispersion curve that passes through the coordinates $(t_0,f_0)$ and $(t_2,f_2)$.

In some cases, the resolution of the dispersion measure that participates in the calculations along dispersion curves (related to the spacing between the different trial values of the dispersion measure that participate in the calculation) may vary at different stages of the calculation. For example, the required resolution for small sub-bands (e.g., early in the calculation) may be smaller than the resolution required at larger sub-bands (e.g., during a later iteration). Thus, a calculated dispersion transform for a larger sub-array may have a higher dispersion parameter resolution than for the sub-arrays that were combined to form the larger sub-array.

Because of the use of lower resolution of the dispersion parameter in small sub-bands, and reuse of common partial integrations on sub-arrays of all sizes by applying addition rules to form the larger sub-arrays, the computational complexity in the computation of the dispersion measure transform may be reduced by a large factor as compared to a brute force calculation (where a set of dispersion curves is calculated for the entire I(t,f) matrix).

When the number of frequency channels is not a power of two, the addition rule may be adjusted to allow a merge of non-equal size sub-bands. In this case, $f_1$ is not taken to be the middle frequency between $f_0$ and $f_2$ but rather the border frequency between the sub-bands.

Since the time $t_0$ represents the final arrival time in a sub-band, in some cases (e.g., for an arrival time $t_0$ at the lower end of the time range of I(t,f)), a continuation of the dispersion curve in the other sub-band (e.g., starting from initial time $t_1$) may lie outside the time range of the other sub-band. In this case, an alternative addition rule may be applied in which the combination band is formed by simply copying the later of the sub-bands:

$$A_{f_0}^{f_2}(t_0,\Delta t) = A_{f_0}^{f_1}(t_0,t_0-t_1).$$

Alternatively, in some cases, time $t_0$ may represent an initial arrival time. In this case, appropriate changes are made to the procedure that is outlined above. In this case, the alternative addition rule may be applied when $t_0$ is at an upper end of the time range of I(t,f) and the final time $t_1$ for the first sub-band is outside the time range. Alternatively, time $t_0$ may represent an arrival time for an arbitrarily or otherwise selected frequency in the range $f_{min}$ to $f_{max}$. In this case, the alternative addition rule may be applied when $t_0$ is at either end of the time range of I(t,f).

Figure 3:
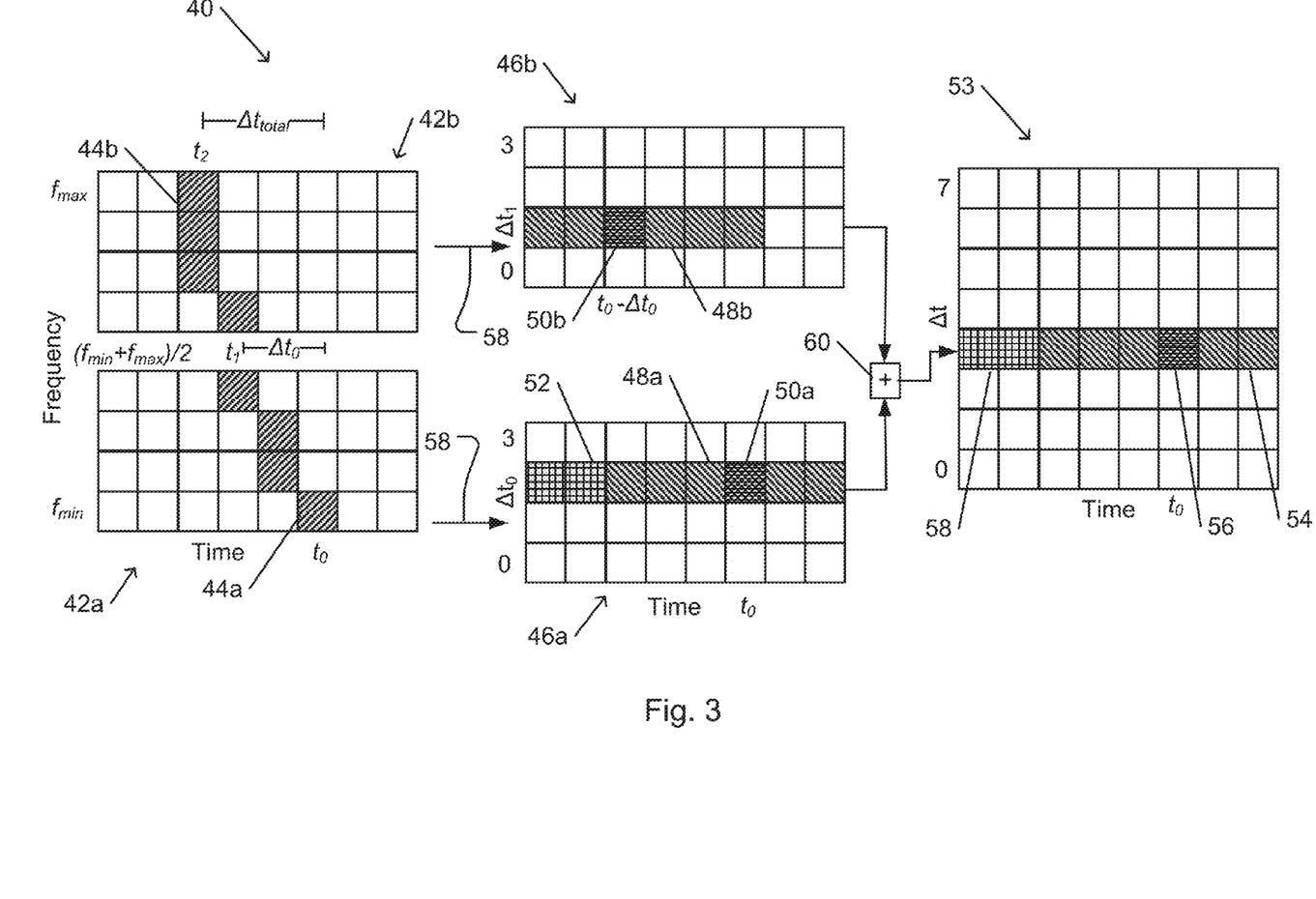
FIG. 3 schematically illustrates an example of a single iteration of application of FDMT for detection of a dispersed pulse signal, in accordance with an embodiment of the present invention.

FIG. 3 schematically illustrates an example of a single iteration of application of FDMT for detection of a dispersed pulse signal, in accordance with an embodiment of the present invention. Specifically, FIG. 3 illustrates a case where dispersion measure D represents a single multiplicative parameter d such that the curves may be parameterized by $\Delta t$.

Iteration 40 operates on intensity sub-arrays 42a and 42b, each representing a division into frequency sub-bands of intensity array I(t,f). Intensity sub-arrays 42a and 42b are parameterized in terms of time, along the horizontal axis, and frequency, along the vertical axis. Intensity sub-array 42a ranges over the frequency sub-band $f_{min}$ to $$\frac{f_{min} + f_{miax}}{2}.$$

Intensity sub-array 42b ranges over the frequency sub-band $$\frac{f_{min} + f_{miax}}{2}$$

to $f_{max}$.

Example dispersion curves 44a and 4b (marked by diagonal hatching) illustrate two parts of a dispersion curve in which a component wave of frequency $f_{min}$ arrives at final arrival time $t_0$. The difference in arrival time between a component wave of frequency $$f_1 = \frac{f_{min} + f_{miax}}{2}$$

and a component wave of frequency $f_{min}$ is $\Delta t_0$ (equal to 2, in the example shown). The total difference in arrival time between a component wave of frequency $f_{max}$ and a component wave of frequency $f_m$ is $\Delta t_{total}$ (equal to 3, in the example shown).

FDMT is separately applied, as represented by arrows 58, to each of intensity sub-arrays 42a and 42a, thus summing cells over each dispersion curve such as dispersion curves 44a and 44b, and others) of intensity sub-arrays 42a and 42a.

When an expected range of dispersion measures is known, FDMT may be applied after application of a frequency-dependent shift or coherent dedispersion based on the expected range.

When the pulse width or profile (there may be a different profile for each frequency, as in pulse scattering) is known, a matched filter approach may be applied. For example, each frequency time series may be convolved the predicted profile for that frequency, with FDMT applied afterward. It may be noted that convolution of the time axis with a uniform pulse profile (for all frequencies) commutes with application of FDMT. Therefore, a few pulse profiles per application of FDMT may be applied without repeating the dedispersion process.

The application of FDMT yields partial FDMT results 46a and 46b, representing $A_{f_{min}}{}^{f_1}(t,\Delta t)$ and $A_{f_1}{}^{f_{max}}(t,\Delta t)$, respectively. Partial FDMT results 46a and 46b are parameterized by final arrival time and by difference in arrival time $\Delta t$.

For example, partial sum cells 50a and 50b represent the sums of the intensities along example dispersion curves 44a and 44b, respectively. Thus, partial sum cell 50a is located at time coordinate $t_0$ and at arrival time difference $\Delta t_0$ (equal to 2 in the example). Similarly, partial sum cell 50b is located at time coordinate $t_0-\Delta t_0$ and at arrival time difference $\Delta t_1$ (equal to 1 in the example).

FDMT iteration result array 53 is formed by combination of partial FDMT results 46a and 46b by applying addition rules 60. Partial result cells 48a and 48b (marked with diagonal hatching) are combined by application of the addition rule $A_{f_0}{}^{f_2}(t_0,\Delta t)=A_{f_0}{}^{f_1}(t_0,t_0-t_1)+A_{f_1}{}^{f_2}(t_1,t_1-t_2)$ to form FDMT result cells 54. Thus, partial sum cells 50a and 50b, are combined by application of the addition rule to form FDMT curve sum 56. By application of a shift along the time axis, this addition may be implemented as a vector operation.

Partial result end cells 52, with no corresponding cells in partial FDMT results 46b with which to combine by application of this addition rule, are copied to form FDMT result cells 58 (marked with horizontal-vertical crosshatching) by application of the alternative addition rule above.

In some cases when combining two sub-bands, the point $t_1$ where dispersion curve 44a continues to dispersion curve 44b may not be well defined. For example, dispersion curve 44a could end at a first time at the end frequency of intensity sub-array 42a, $f_0+(2^i-1)\delta_f$, and dispersion curve 44b may start at a different second time at the start frequency of the intensity sub-array 42b, $f_0+2^i\delta_f$, where $\delta_f$ is the width of a frequency bin. This problem may be addressed by calculating two versions of $t_1$, one with the end frequency of dispersion curve 44a in intensity sub-array 42a, and the other with the start frequency of dispersion curve 44a in intensity sub-array 42a.

Figure 4:
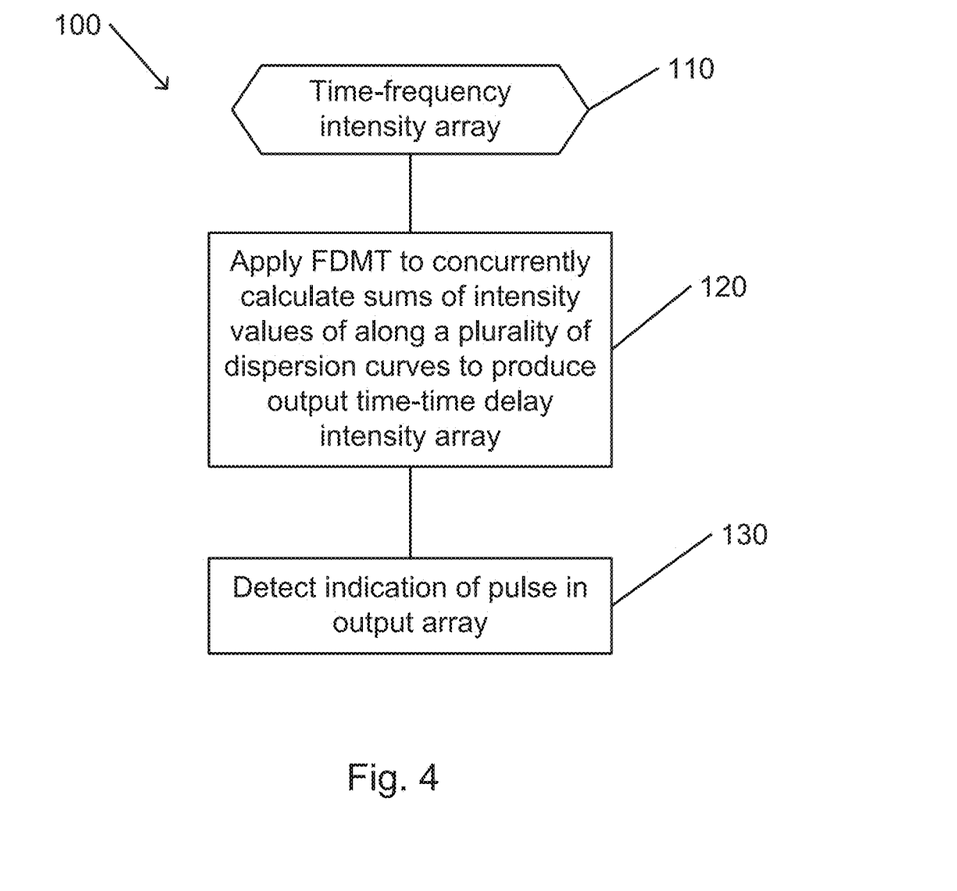
FIG. 4 is a flowchart depicting a method for incoherent dedispersion for detection of a dispersed pulse signal, in accordance with an embodiment of the present invention.

FIG. 4 is a flowchart depicting a method for incoherent dedispersion for detection of a dispersed pulse signal, in accordance with an embodiment of the present invention.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Incoherent dedispersion pulse detection method 100 may be executed by a processor, e.g., of a pulse dedispersion system. Incoherent dedispersion pulse detection method 100 may be executed automatically, e.g., upon input of a measured (time-sampled intensity of a received signal, in response to a signal or command that is input or otherwise indicated by a user or operator of a pulse dedispersion system, or otherwise.

Incoherent dedispersion pulse detection method 100 may be executed on an obtained time-frequency input intensity array representation of a measured signal (block 110). For example, the intensity array may have been prepared prior to execution of incoherent dedispersion pulse detection method 100, or as part of the operation of obtaining the array during execution of incoherent dedispersion pulse detection method 100. The measured signal may be acquired in the form of a measured time series of intensity values. The signal is assumed to have been dispersed by traversal of a dispersive medium between the source of the signal and a receiver of the signal. The dispersion in the medium is assumed to have a known functional form (e.g., as is characteristic of the type or radiation and of an expected type of dispersive medium). The dispersion is assumed to be characterized by an unknown dispersion measure.

Each intensity value (cell) of the array represents an intensity of a frequency component of a measured signal at a particular measurement time. For example, the intensity array may be generated by application of STFT to a received signal that includes a time series of measured intensity values.

The value of each cell is indicative of an intensity of a frequency component of measured intensity value during a time period that is characterized by a time. A time coordinate of each cell within the array is indicative of a representative time (e.g., midpoint, end, or another point) of the time period. A frequency coordinate of each cell is indicative of a frequency of the frequency component that is represented by the value of the cell.

FMDT may be applied to the intensity array to concurrently calculate sums of intensity values of along a plurality of dispersion curves, each dispersion curve resulting from a different value of a dispersion measure (block 120).

FMDT concurrently sums the values of subsets of the cells of the input matrix. Each subset lies along one of a plurality of different dispersion curves, each corresponding to a different value of the dispersion measure. Each of the different dispersion curves is uniquely characterized by a time coordinate of one of the cells of the subset of cells that is included in that dispersion curve, the characterizing cell having a preselected frequency coordinate. Each dispersion curve is distinguished from other dispersion curves that pass through the characterizing cell by a unique value of a dispersion measure.

An output array of the sums is produced. A position of a sum value in the output array is indicative of a time of measurement and a dispersion measure.

A sub-band projection function $P(f_0,f_1,D)$ may be defined to receive a set of dispersion parameters and to return a set of indices (for example, a difference in arrival time $\Delta t$ where D represents a single multiplicative parameter d) indicative of a unique (up to a time shift) dispersion curve that crosses the sub-band that is defined by $f_0,f_1$, and that is globally parameterized by the parameter set D. This function may enable accommodating a situation in which for a particular sub-band, both the resolution and span of the dispersion measure parameters D are smaller than that of a global parameter space in the search. Moreover, there may be different sets of dispersion parameters $D_1,D_2$ that are different globally, but locally cross the same dispersion curve in a particular sub-band. In such a case, $P(f_0,f_1,D_1)=P(f_0,f_1,D_2)$.

FMDT may be applied by application of an FMDT algorithm to the intensity array. An FMDT algorithm that converts input in the form of an intensity matrix $I(f,t)$ to output in the form of a time series of integrated flux density as a function of trial dispersion measures in a multi-dimensional table $A_{f_{min}}^{f_{max}}(t,D)$, may be written in the form of the following pseudocode (where $\delta_t$ is the width of a time bin):

---

Intitate the table by $A_f^{f+\delta_f}(t, D) = \dfrac{\delta}{G(f, f+\delta_f, D)} \sum_{j=0}^{G(f, f+\delta_f, D)/\delta_t} I(t + j\delta_t, f)$ for iteration j = 1 to j = $\log_2 N_f$ do
  for $f_0$ in the range [$f_{min}$, $f_{max}$] with steps $2^j \delta_f$ do
    $f_2 = f_0 + 2^j \delta_f$ $$f_1 = \frac{f_2 + f_0}{2}$$

for D in the set of unique curves in the sub-band [$f_{min}$, $f_{max}$] do:
      $D_{(0, 1)} = P(f_0, f_1, D)$
      $D_{(1, 2)} = P(f_1, f_2, D)$
      for $t_0$ in range [$G(f_0, f_1, D), N_t$] do
        $t_1 = t_0 - G(f_0, f_1, D)$
        $A_{f_0}^{f_2}(t_0, D) = A_{f_0}^{f_1}(t_0, D_{(0, 1)}) = A_{f_1}^{f_2}(t_1, D_{(1, 2)})$
      end for
      for $t_0$ in the range [0, $G(f_0, f_1, D)$] do
        $A_{f_0}^{f_2}(t_0, D) = A_{f_0}^{f_1}(t_0, D_{(0, 1)})$
      end for
    end for
  end for
end for

---

For example, in the particular case of dispersion by a cold plasma, the projection operator may be expressed as $P(f_1, f_2, D) = [d(f_1^{-2} - f_2^{-2})]$. The form of the dispersion relation $G(f_1, f_2, D)$ is such that one dispersion curve passes between any two points in the input intensity matrix $I(t,f)$. Therefore, the output may be parameterized by $\Delta t$, the difference in arrival time for different component wavelengths of the signal of a sub-band. The pseudocode in this case may be written as follows:

---

Initiate the table by $A_f^{f+\delta_f}(t, \Delta t) = \dfrac{\delta_t}{\delta t} \sum_{j=0}^{\Delta t/\delta_t} I(t + j\delta_t, f)$ for iteration j = 1 to j = $\log_2 N_f$ do
  for $f_0$ in the range [$f_{min}$, $f_{max}$] with steps $2^j \delta_f$ do
    $f_2 = f_0 + 2^j \delta_f$ $$f_1 = \frac{f_2 + f_0}{2}$$

$$C_{f_2, f_0} = \frac{f_1^{-2} - f_0^{-2}}{f_2^{-2} - f_0^{-2}}$$

$\Delta t_{max}(j, f_0) = G(f_0, f_2, d_{max})$
    for $\Delta t$ in the range [0, $\Delta t_{max}(j, f_0)$] with steps $\delta_t$ do
      for $t_0$ in range [$C_{f_2, f_0} \Delta t, N_t$] with steps $\delta_t$ do
        $t_1 = t_0 - C_{f_2, f_0} \Delta t$
        $A_{f_0}^{f_2}(t_0, \Delta t) = A_{f_0}^{f_1}(t_0, t_0 - t_1) + A_{f_1}^{f_2}(t_1, t_1 - t_2)$
      end for
      for $t_0$ in the range [0, $C_{f_2, f_0} \Delta t$] with steps $\delta_t$ do
        $A_{f_0}^{f_2}(t_0, \Delta t) = A_{f_0}^{f_1}(t_0, t_0 - t_1)$
      end for
    end for
  end for
end for

---

The data initialization that is performed prior to the first iteration generates $A_{f_0}^{f_1}$ for every pair of consecutive frequencies. If the maximum dispersion delay between pairs of consecutive frequencies is smaller than the width $\delta_t$ of a time bin of $I(t,f)$, then the initialization may be simply:

$$A_f^{f+\delta_f}(t, 0) = I(t, f)$$

where $$\delta_f = \frac{f_{max} - f_{min}}{N_f}.$$

If the maximum dispersion delay is wider than the width of a time bin, then the initialization may include computing partial sums over the time axis, for example:

$$A_f^{f+\delta_f}(t, \Delta t) = \sum_{j=0}^{\frac{\Delta t}{\delta_t}} I(t + j\delta_t, f).$$

For example, in the case of electromagnetic waves traversing a cold plasma, the maximal time delay within each frequency bin is uniquely determined by $d_{max}$, the maximal dispersion measure d that is under consideration:

$$\Delta t_{max}(f_0) = d_{max}(f_0^{-2} - (f_0 + \delta_f)^{-2}).$$

Alternatively, if for a certain dispersion measure D the time delay within each single frequency bin is larger than one time bin, the size of each time bin may be made smaller.

The computational complexity of incoherent dedispersion as described herein may be calculated by tracing the number of operations performed. The number of additions in iteration j is bounded from above by $N_b N_t \Delta t_{min}(j)$ where $N_b$ is the number of sub-bands processed during the current iteration, and $\Delta t_{max}(j)$ is the maximum time shift within a single sub-band at iteration j for the curve with highest dispersion measure. For example, for the case of electromagnetic radiation in a cold plasma:

$$\Delta t_{max}(j, f_0) = d_{max}\left(f_0^{-2} - (f_0 + 2^j \delta_f)^{-2}\right) \text{ and}$$

$$\Delta t_{max}(j) = \max_{f_0}\{\Delta t_{max}(i, f_0)\} = d_{max}\left(f_{min}^{-2} - (f_{min} + 2^j \delta_f)^{-2}\right).$$

As a first order approximation, it may be assumed that the dispersion curve is approximately linear, so that the number of unique dispersion trials needed in iteration j+1 is roughly twice the number needed in iteration j. In the last iteration, $|\Delta t| = N_\Delta$, such that in iteration j, $$\Delta t_{max}(j) \approx \frac{N_\Delta 2^j}{N_f}.$$

The number of sub-bands ($N_b$) processed in each iteration is $$N_b = \frac{N_f}{2^j}.$$

Therefore, with the approximation of linear dispersion (or narrow band):

$$N_b \Delta t_{max}(j) \approx \max\{N_\Delta, N_b\}.$$

Summing over all iterations, and assuming $N_\Delta$ is dominant in all iterations, and taking into account the number of entries in each added row ($N_t$), the complexity may be calculated to be $$C_{FDMT} = N_t N_\Delta \log_2(N_f).$$

If it is assumed that $N_b$ is dominant, the complexity may be calculated as $$C_{FDMT} = N_t N_f + \frac{N_t N_f}{2} + \ldots = 2N_t N_f.$$

Therefore, the total complexity of the algorithm is bounded from above by:

$$C_{FDMT} \leq 2N_t N_f + N_t N_\Delta \log_2(N_f).$$

Rewriting the complexity analysis in terms of the more naturally defined quantities $N_s$, the number of samples, and $N_d$, the dispersion in number of samples, and using $N_s = N_f N_t$ and $N_\Delta = N_d / N_f$, $$C_{FDMT} \leq 2N_f \frac{N_s}{N_f} + \frac{N_d}{N_f} \frac{N_s}{N_f} \log_2(N_f) = 2N_s + \frac{N_s N_d}{N_f^2} \log_2(N_f).$$

Adding to the above the complexity of data preparation by STFT, $N_s \log_2(N_f)$, and utilizing the fact that if $N_f$ is chosen such that $N_f < N_p$ ($N_p$ representing the number of samples in a pulse), the size of input matrix $I(f,t)$ may be reduced both in time and frequency dimensions by a factor $$\frac{N_p}{N_f}$$

to a final size of $N_p$, $$C_{FDMT} \leq N_s \log_2 N_f + \frac{2N_f N_s}{N_p} + \frac{N_d N_s}{N_p^2} \log_2(N_f).$$

Thus, the complexity of the data preparation dominates the operation count of the algorithm whenever incoherent dedispersion is maximally sensitive (e.g., $N_d < N_p^2$).

The complexity of incoherent dedispersion in accordance with an embodiment of the present invention may be compared with the complexity of other dedispersion techniques. For example, a tree dedispersion algorithm calculates the integrals of all the straight line paths with slopes between 45° and 90° through the input time vs. frequency matrix (similar to the discrete Radon transform). The computational complexity of tree dedispersion algorithm is $N_t N_f \log_2 N_f$. However, in order to compensate for loss of sensitivity due to a nonlinear dispersion curve, the tree dedispersion algorithm may be applied to many small sub-bands of the data, an approach that is not exact that increases the computational complexity. A brute force dedispersion algorithm simply scans all the trial dispersion measures, one at a time, integrating along each curve on the input data and finding curves with excess power. This brute force method is exact, but has the high computational complexity given by $N_\Delta N_f N_t$, where $N_\Delta$ is the number of trial dispersion measures that are scanned (noting that $N_\Delta = N_d / N_f$).

In some cases, the dispersion measure may include a plurality of dispersion parameters. In such a case, the number of different dispersion curves in a sub-array may increase at a rate that is greater than linear with respect to sub-array width. In such cases, the complexity of the algorithm is linear with respect to the dimension of the output, as the volume of the sub-array FDMT products may grow exponentially with each iteration. Thus the complexity of the entire process may be dominated by the last iterations.

In the case of exponentially expanding complexity (e.g., due to the dispersion measure including a plurality of dispersion parameters), and considering that the goal of the process is detection of a statistically significant pulse, it may be beneficial to stop combination of the entire sub-arrays before completing the combination to form a single output array. Instead, sub-arrays combination may continue for only those cells (spanning ranges of dispersion parameters) whose values (the intermediate FDMT results) are considered significant (e.g., as determined by a set of criteria). For example, a cell value of an intermediate result array may be considered to be significant if the cell value does not preclude the presence of a pulse in the dispersion curve that is represented by that cell in the corresponding sub-band. For example, a value may be considered to preclude the presence of a pulse if its value does not differ from a cell value that represents a mean background noise level by at least a predetermined threshold value. The threshold value may differ from iteration to iteration.

For example, FDMT may be applied as described, and the process halted when a suspected pulse is expected to contain a non-negligible amount of information in a sub-array (e.g., indicated by presence of a dispersion curve that differs by at least one standard deviation from an expected random background mean intensity, or in accordance with another criterion) The sub-arrays may then be combined sequentially, keeping only those dispersions that meet predetermined criteria (e.g., exceed a predetermined set of thresholds). The criterion for significance may change (e.g., become stricter), during each iteration of combining sub-arrays.

In this way, the complexity of the last stages may be reduced well below one addition per result, while retaining maximal sensitivity for pulse detection.

The set of thresholds may be adjusted to provide a sufficient or predetermined probability of success in finding a sufficiently significant pulse.

In some cases, the width of a machine word may be utilized to pack several instances of the dedispersion procedure into a single computation. For example, so utilizing a computer that operates on machine words of 64 bits may result in a speedup factor of 4 to 8, depending on the number of bits per frequency and the maximum measured intensity of the pulse. Further speed of calculation may be achieved by continuously storing the time axis in order to speed up memory access operations.

The results of the dedispersion may be examined to detect any indication of pulse in the resulting output array (block 130). For example, a cell of the output array with a value that is significantly different from the values of surrounding cells may be indicative of a dispersed pulse that was received at a time that corresponds to the position of that cell in the array. The position in the array may also be indicative of a value of a dispersion measure describes the dispersion that was undergone by the pulse.

In accordance with an embodiment of the present invention, a variant of the incoherent dedispersion method described above may be applied. The variant algorithm may be easily parallelized on all architectures to facilitate memory access, by eliminating the shift along the time axis that is required to add partial result cells 48a and 48b to form FDMT result cells 54 (FIG. 3). The time shift is eliminated by applying a fast Fourier transform (FFT) or other Fourier transform to the time axis. This converts the shift operation to a multiplication with a shift vector that is the Fourier transform of a shifted delta function, All additions may be of numbers from the same (Fourier transformed) time coordinate. Therefore, different parts of the (Fourier transformed) time axis may be assigned to different processing units and thus reduce the need for shared memory or data transport. The results are then Fourier transformed back to the time axis. This variant is herein referred to as FFT-FDMT, represented (in the case where dispersion measure D represents a single multiplicative parameter d such that the curves may be parameterized by $\Delta t$) by the following pseudocode for input $I(f,t)$ and output $A_{f_{min}}^{f_{max}}(t,\Delta t)$ (as before):
Initiate the table by $$A_f^{f+\frac{f_{max}-f_{min}}{N_f}}(t, \Delta t) = \sum_{j=0}^{\Delta t/\tau} I(f, t + j\tau)$$

Initiate shift vector $V(\tilde{t}_0, \Delta T) = F(\delta(\Delta T))(\tilde{t}_0)$, where $\delta(x)$ is a vector with value 1 at position x and 0 elsewhere, F is the FFT operator, and $\tilde{t}_0$ is the index of the Fourier transformed time axis.

Fourier transforms axis $B_f^{f+\delta_f}(\tilde{t}, \Delta t) = F(A_f^{f+\delta_f}(:, \Delta t))$ Transpose the data such that the frequency and $\Delta t$ axes are continuous in memory, and time axis is distributed across all computing units.

--- for $\tilde{t}_0$ in the range $[0, N_t]$ do
  for j in the range $[1, \log_2 N_f]$ do
    for $f_0$ in the range $[f_{min}, f_{max}]$ with steps $2^j \delta_f$ do
      $f_2 = f_0 + 2^j \delta_f$ $$f_1 = \frac{f_2 + f_0}{2}$$

$$C_{f_2, f_0} = \frac{f_1^{-2} - f_0^{-2}}{f_2^{-2} - f_0^{-2}}$$

$$\Delta t_{max} = (j, f_0) = N_\Delta \frac{f_0^{-2} - (f_0 + 2^j \delta_f)^{-2}}{f_{min}^{-2} - f_{max}^{-2}}$$

for $\Delta t$ in the range $[0, \Delta t_{max}(j, f_0)]$ do
        $\Delta t_1 = C_{f_2, f_0} \Delta t$
        $B_{f_0}^{f_2}(\tilde{t}_0, \Delta t) = B_{f_0}^{f_1}(\tilde{t}_0, \Delta t_1) + B_{f_1}^{f_2}(\tilde{t}_0, \Delta t - \Delta t_1) V(\tilde{t}_0, t_1)$
      end for
    end for
  end for
end for

---

Transpose the data back such that time is again continuous in memory.

Perform inverse FFT on time axis $A_{f_{min}}^{f_{max}}(\tilde{t}, \Delta t) = F^{-1} B_{f_{min}}^{f_{max}}(:, \Delta t))$ When implementing the FFT-FDMT algorithm, the complex floating point data type is used. In this case, another input may be packed to the imaginary part of the input, such that the imaginary part of the result is that of the other input.

If the pulse width is slightly larger than one bin, a low-pass filter on the time axis may be applied, which may be more sensitive than binning the time axis and more efficient than retaining a high sampling rate.

If the maximum dispersion broadens the pulse to more than one time bin per frequency bin, the initialization phase of the algorithm may inflate the data from size $N_t N_f$ to size $N_\Delta N_f$. The partial sum operation of the initialization phase is equivalent to an application of a low-pass filter on the time axis. This may enable reduction of computation and memory use by reserving time bins for different values of $\Delta t$. This can be used in the case of large dispersion measures to reduce the algorithm's complexity from $N_\Delta N_t \log_2(N_f)$ to $$2 N_t N_f \log_2 \left( \frac{N_\Delta}{N_f} \right).$$

Since convolution is a cyclical operation, all the shifts done in this algorithm are cyclical shifts. Therefore, the time axis is padded with $N_\Delta$ zeros prior to the Fourier transform. To avoid the increase in complexity when $N_\Delta = N_t, N_t \gg N_\Delta$ may be selected. This may be possible if the size of the input table is not too close to the maximum memory (or cache) capacity.

When the algorithm is applied to search for periodicity, transforming back the time-axis after application of FDMT-FFT may be unnecessary.

In some cases, e.g., where the pulse is shorter than the dispersion time, coherent dedispersion would often be applied to obtain accurate results. In accordance with an embodiment of the present invention, coherent hybrid FDMT dedispersion may be applied. Application of coherent hybrid FDMT dedispersion may be more computationally efficient than would be application of other techniques for coherent dedispersion.

In coherent hybrid FDMT dedispersion, the raw signal is coherently dedispersed with coarse trial dispersion values (with steps $\delta d$), after which STFT is applied, the absolute value of the STFT result being squared, followed by application of FDMT with the maximal dispersion being the next coarse-trial coherent dedispersion. This process ensures that there is no loss of sensitivity relative to application of coherent dedispersion.

Figure 5:
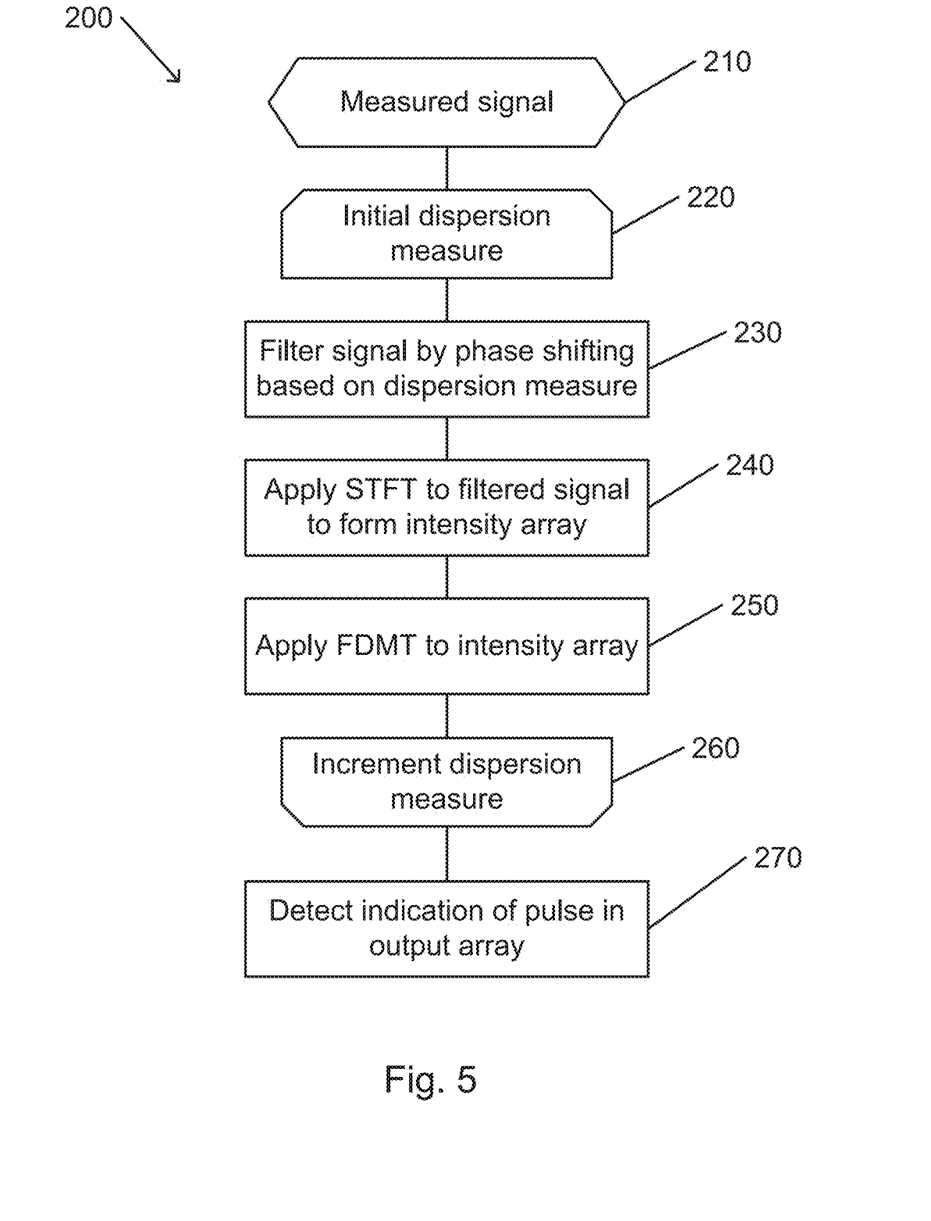
FIG. 5 is a flowchart depicting a method for coherent hybrid FDMT dedispersion for detection of a dispersed pulse signal, in accordance with an embodiment of the present invention.

FIG. 5 is a flowchart depicting a method for coherent hybrid FDMT dedispersion of a received signal, in accordance with an embodiment of the present invention.

Coherent hybrid FDMT dedispersion pulse detection method 200 may be executed by a processor, e.g., of a pulse dedispersion system. Coherent hybrid FDMT dedispersion pulse detection method 200 may be executed automatically, e.g., upon input of a received signal, in response to a signal or command that is input or otherwise indicated by a user or operator of a pulse dedispersion system, or otherwise. Application of operations of coherent hybrid FDMT dedispersion pulse detection method 200 may be limited to a case where dispersion measure D represents a single multiplicative parameter d such that the curves may be parameterized by $\Delta t$.

Coherent hybrid FDMT dedispersion pulse detection method 200 may be executed on an input measured signal (block 210). For example, the input signal may include an equally spaced time series of voltage measurements, or other measurements that may be input into a processor or saved on a data storage device for processing.

The operations that are represented by the blocks between block 220 and block 260 are applied in a loop over a range of values of a dispersion measure (e.g., a single multiplicative factor or another range of values of the dispersion measure). The dispersion measure is first assigned an initial value (block 220).

For each value of the dispersion measure, a filter $\hat{H}_{d_0}(f)$ may be applied to the input signal, the filter being based on the current value $d_0$ of the dispersion measure (block 230).

For example, the filter may be convolved (or, equivalently, multiplied in a Fourier transform space) with the input signal. The filter may have the form of a phase shift $$\hat{H}_{d_0}(f) = \exp\left(\frac{2\pi i d_0}{f+f_0}\right),$$

where $f_0$ is a representative frequency of the frequency band.

STFT may be applied to the filtered signal to generate an intensity array (block 240).

FMDT may be applied to the generated intensity array (block 250), as described above in connection with incoherent dedispersion.

The value of the dispersion measure may be incremented (up to a predetermined final value) and the operations depicted in blocks 230 to 250 may be applied in accordance with the new current value of the dispersion measure (block 260).

A coherent hybrid FDMT dedispersion method FMDT that is applied to an input signal x(t) to yield output in the form of a time series of integrated flux density as a function of trial dispersion measures $d<d_{max}$ with steps $$\frac{N_p}{N_d}d_{max}$$

and all exit times $t_0 < N_s \tau$ with steps $N_p \tau$, may be written in the form of the following pseudocode (assuming a dispersion measure in the form of a single multiplicative factor):

Apply STFT with block size $N_p$ on x(t), to obtain $I_c(t,f)$.
for dispersion measure $d_0$ in the range $[0,d_{max}]$ in steps of $$2\frac{N_p^2}{N_d}d_{max}$$

($N_p$ representing the number of samples in a pulse, and $N_d$ is the number of trial values of the dispersion measure) do:
Apply the filter $$\hat{H}_{d_0}(f) = \exp\left(\frac{2\pi i d_0}{f+f_0}\right)$$

to $I_c(t,f)$ via convolving filterbank (e.g., apply small convolutions in separate channels), perform absolute value squared (and sum over all polarizations, where applicable, e.g., for radio signals transmitted through a plasma) to get I(t,f).

Apply FDMT to $I_c(t,f)$, with $-N_p^2 \leq \Delta t = N_p^2 \tau$, and output the partial result $A_{f_{min}}^{f_{max}}(d_0+d, t_0)$
end for If $N_{\delta d}$ denotes the number of bins of length $\tau$ that a delta function pulse will spread upon when dispersed by $\delta d$. In order to retain sensitivity, the maximal dispersion residual to be processed by the following FDMT must be hounded from above by $N_{\delta d}=2N_p^2$. (The factor of 2 is due to the fact that FDMT can be applied to find also negative dispersions). Therefore, the number of dispersion trials that are required for coherent dedispersion is $$N_{coherent} = \frac{N_d}{2N_p^2}.$$

This process may approach maximum sensitivity, and its complexity is given by $$C_{hybrid} = \frac{N_d}{2N_p^2}N_s N_{pol}(\log_2(N_d) + \log_2(N_f)) + \frac{2N_d N_s}{N_p^2} + \frac{N_d N_s}{N_p^2}\log_2(N_f),$$

where $N_{pol}$ is the number of polarization directions (e.g., 1, for compression waves).

Simplifying, the computational complexity for detection of a pulse of length $N_p$ is:

$$C_{hybrid} = \frac{N_d N_s}{2N_p^2}(4 + N_{pol}\log_2(N_d) + (2 + N_{pol})\log_2(N_p)).$$

This may be compared with the complexity of coherent dedispersion $$C_{coherent} = N_{pol}\frac{N_d}{N_p}N_s\log_2(N_p).$$

The results of coherent hybrid FDMT dedispersion may be examined to detect any indication of pulse in the resulting output array (block 270). For example, a cell of the output array with a value that is significantly different from the values of surrounding cells may be indicative of a dispersed pulse that was received at a time that corresponds to the position of that cell in the array. The position in the array may also be indicative of a value of a dispersion measure describes the dispersion that was undergone by the pulse.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:
1. A method for detecting a dispersed pulse in a received signal that has been dispersed by a dispersive medium, the method comprising:
obtaining an input array of cells, the value of each cell being indicative of an intensity of a frequency component of the signal during a time period at a represen- tative time, a time coordinate of each cell within the array being indicative of the representative time, and a frequency coordinate of each cell being indicative of a frequency of the frequency component;

applying a fast dispersion measure transform (FDMT) to the input array to concurrently sum the values of subsets of the cells of the input array, the coordinates of the cells of each subset lying along one of a plurality of different dispersion curves, each dispersion curve being defined by a known non-linear functional form of dispersion in the dispersive medium and being uniquely characterized by a time coordinate of one of the cells of the subset of cells that is included in that dispersion curve, said one of the cells having a preselected frequency coordinate, and by a value of a dispersion measure, the summing to produce an output array of the sums, wherein a position of each sum in the array is indicated by a coordinate that is indicative of said time coordinate of one of the cells and by a coordinate that is indicative of the dispersion measure value, the application of FDMT including:

initially generating a plurality of sub-arrays of the input array, each sub-array representing a frequency sub-band of an initial frequency range of the frequency coordinates of cells of the input array, the value of each cell of each of the sub-arrays being a summation over each of the different dispersion curves that includes a cell of that sub-array; and iteratively combining pairs of adjacent sub-arrays in accordance with an addition rule until all of the initially generated plurality of sub-arrays are combined into said output array of the sums; and identifying a cell of the output array that is indicative of a transmitted pulse.

2. The method of claim 1, wherein obtaining the input array comprises applying a short time Fourier transform (STFT) to a time series of measured intensity values of the received signal.

3. The method of claim 2, wherein obtaining the input array further comprises applying a phase shift to each component frequency prior to the application of the STFT.

4. The method of claim 1, wherein the coordinate that is indicative of the dispersion measure value comprises a time delay over the sub-band.

5. The method of claim 1, wherein the addition rule comprises adding the values of cells in the adjacent sub-arrays that correspond to a single dispersion curve.

6. The method of claim 5, wherein the addition rule comprises copying the values of cells in one of the adjacent sub-arrays when no cells of the other sub-array of the pair of adjacent sub-arrays is included in the same dispersion curve.

7. The method of claim 6, wherein said iteratively combining pairs of adjacent sub-arrays is halted prior to all of the initially generated plurality of sub-arrays being combined into said output array of the sums, subsequent application of the addition rule being limited to combining those cells whose values are determined to be significant.

8. The method of claim 7, wherein a cell value is determined to be significant when the presence of a pulse signal in a dispersion curve that corresponds to that cell is not precluded.

9. The method of claim 8, wherein a cell value is considered to be significant when the value differs from a mean random background value by at least a predetermined threshold value.

10. The method of claim 9, wherein the threshold values are different for different iterations.

11. A system for detecting a pulse in a signal that has traversed a dispersive medium, the system comprising:

a receiver for receiving the signal; and a processor in communication with a computer readable medium, wherein the computer readable medium contains a set of instructions wherein the processor is designed to carry out the set of instructions to:

obtain an input array of cells, the value of each cell being indicative of an intensity of a frequency component of the signal during a time period at a representative time, a time coordinate of each cell within the array being indicative of the representative time, and a frequency coordinate of each cell being indicative of a frequency of the frequency component;

apply a fast dispersion measure transform (FDMT) to the input array to concurrently sum the values of subsets of the cells of the input array, the coordinates of the cells of each subset lying along one of a plurality of different dispersion curves, each dispersion curve being defined by a known non-linear functional form of dispersion in the dispersive medium and being uniquely characterized by a time coordinate of one of the cells of the subset of cells that is included in that dispersion curve, said one of the cells having a preselected frequency coordinate, and by a value of the dispersion measure, the summing to produce an output array of the sums, wherein a position of each sum in the array is indicated by a coordinate that is indicative of said time coordinate of one of the cells and by a coordinate that is indicative of the dispersion measure value, the application of FDMT including:

initially generating a plurality of sub-arrays of the input array, each sub-array representing a frequency sub-band of an initial frequency range of the frequency coordinates of cells of the input array, the value of each cell of each of the sub-arrays being a summation over each of the different dispersion curves that includes a cell of that sub-array; and iteratively combining pairs of adjacent sub-arrays in accordance with an addition rule until all of the initially generated plurality of sub-arrays are combined into said output array of the sums; and identify a cell of the output array that is indicative of a transmitted pulse.

12. The system of claim 11, wherein the instructions to obtain the input array include instructions to apply a short time Fourier transform (STFT) to a time series of measured intensity values of the received signal.

13. The system of claim 12, wherein the instructions to obtain the input array further comprise instructions to apply a phase shift to each component frequency prior to the application of the STFT.

14. The system of claim 11, wherein the coordinate that is indicative of the dispersion measure value comprises a time delay over the sub-band.

15. The system of claim 11, wherein the addition rule comprises adding the values of cells in the adjacent sub-arrays that correspond to a single dispersion curve.

16. The system of claim 15, wherein the addition rule comprises copying the values of cells in one of the adjacent sub-arrays when no cells of the other sub-array of the pair of adjacent sub-arrays is included in the same dispersion curve.

17. The system of claim 16, the instructions include instructions to halt said iteratively combining pairs of adjacent sub-arrays prior to all of the initially generated plurality of sub-arrays being combined into said output array of the sums, and to subsequently apply the addition rule only to combine those cells whose values are determined to be significant.

18. The system of claim 17, wherein a cell value is determined to be significant when the presence of a pulse signal in a dispersion curve that corresponds to that cell is not precluded.

19. The system of claim 18, wherein a cell value is considered to be significant when the value differs from a mean random background value by at least a predetermined threshold value.

20. The system of claim 19, wherein the threshold value is different for different iterations.

* * * * *